United States Patent [19]

Schneeberger et al.

[11] 4,365,765
[45] Dec. 28, 1982

[54] LUBRICATED CAM DRUM

[75] Inventors: Ruedi Schneeberger; Andreas Schwander, both of Seuzach, Switzerland

[73] Assignee: Rieter Machine Works, Ltd., Winterthur, Switzerland

[21] Appl. No.: 114,206

[22] Filed: Jan. 22, 1980

[51] Int. Cl.$^3$ .............................................. B65H 54/28
[52] U.S. Cl. .................... 242/43 R; 184/1 R; 242/158.3; 242/158.5
[58] Field of Search ............... 242/43 R, 158.3, 158.5; 184/1 R; 74/567, 569

[56] References Cited

U.S. PATENT DOCUMENTS

| | | | |
|---|---|---|---|
| 1,028,176 | 6/1912 | Ambler | 184/1 R |
| 2,704,465 | 3/1955 | Haller | 184/1 R X |
| 2,794,517 | 6/1957 | Keith | 184/1 R |
| 3,339,670 | 9/1967 | McGrew, Jr. et al. | 184/1 R X |
| 3,373,949 | 3/1968 | Swallow | 242/43 R |
| 3,891,154 | 6/1975 | Dietiker | 242/43 R |
| 3,968,939 | 7/1976 | Bense | 242/43 R |
| 3,984,061 | 10/1976 | Schreiber | 242/43 R |
| 4,116,396 | 9/1978 | Fluck | 242/43 R |

*Primary Examiner*—Stanley N. Gilreath
*Attorney, Agent, or Firm*—Kenyon & Kenyon

[57] ABSTRACT

The invention deals with problems arising in lubrication of the helical cam grooves of cam drums used in thread traversing mechanisms of winding machines. The drum is provided with an internal space acting as a lubricant reservoir. A passage extends between the space and the groove so that centrifugal force urges lubricant outwardly along the passage from the space towards the groove. Flow along the passage is controlled by a porous sintered metal body which permits a desired degree of a given lubricant to pass along the passage at a given rotational speed.

19 Claims, 5 Drawing Figures

LUBRICATED CAM DRUM

The present invention relates to a traverse cam drum for a winding machine for textile threads, the drum having an external cam groove to receive a slider portion of a thread guide member which in use is reciprocated longitudinally of the cam drum by reason of the contact between the cam-following slider portion and the cam groove on the drum during rotation of the latter about its axis. Such a drum is referred to hereinafter as "drum of the type defined".

PRIOR ART

Cam drums as described above are well known in the thread winding art. It is also well known that there is a problem in the frictional contact of the slider with the cam groove and it is common practice to lubricate the groove to deal with this problem. The most common solution is the formation of a lubricant sump in a housing surrounding the cam drum, and supply of oil from the sump to the groove, e.g. as shown in U.S. Pat. No. 2,794,517 where the oil is transferred from the sump to a recess in the drum by way of a wick element and from there via a passage in the drum to the base of the groove. Several problems arising in this type of system have been explained in U.S. Pat. No. 3,968,939, which suggests oil mist lubrication of the interior of the housing. Yet a further approach has been suggested in U.K. specification No. 1,163,721, Swiss specification No. 533,260 and German Published Specification No. ALS 1,273,289. In those cases, lubricant is force fed to the interior of a hollow shaft passing through the cam drum, and from the shaft interior it is passed to a passage extending through the drum to base of the groove. The main flow control is via the force feed. An earlier solution of the same general type is shown in U.S. Pat. No. 1,028,176 where flow of oil from the interior of a cam drum to a groove therein is controlled by a spring biased valve which is opened intermittently by the cam itself.

A common problem with all the prior systems is their extreme complication. This makes them expensive to produce, difficult to maintain, and, in some cases, very liable to soil the thread product by transfer of oil to that product.

PRESENT INVENTION

It is an object to the present invention to provide a simple, economical solution to the lubrication problem in traverse cam drums.

The invention provides a traverse cam drum of the type defined comprising a closable space within the drum adapted to contain a supply of lubricant in use, a passage communicating the said space with said groove such that centrifugal force acting on lubricant in the space in use will force it along the passage and a porous body in the passage, the pores of the body providing through flow channels which permit a limited flow of a given lubricant to pass through the passage to the groove at a given rotational speed in use.

The porous body may be sintered metal body, but alternative porous bodies, e.g. felt or wood, may be used. In any event, the porosity is preferably in a range from 20% up to 35% and a porosity in the range 25-30% will usually be suitable. The pores must of course provide adequate through flow channels for the lubricant, to pass through the body i.e. they must be communicating pores at least in the desired flow direction.

The passage may comprise an inner portion of relatively large cross section receiving said body and an outer portion of smaller cross-section opening onto the groove. The passage may have a pair of outer portions opening into the groove adjacent respective groove flanks or even opening partially onto the flanks themselves.

There may be only one passage located approximately midway along the length of the drum. Preferably, the porous body is simply a press fit in the passage, but means may be provided to form a seal between the circumference of the body surrounding the through flow channels and the adjacent wall of the passage to stop any leakage path there.

The space may be partly defined by a portion of the internal surface of the wall of the drum, and the passage may open onto said surface portion. The circumferential surface defining the space may be at least partially tapered in a sense tending to feed lubricant towards the passage during rotation of the drum in use. This tapering may be produced by means of a suitable insert secured in a bore of uniform cross-section in the drum interior. The drum may be mounted in use on a support/drive shaft, and the space may surround the shaft. Preferably, a closable port is provided in the wall of the drum to enable refilling of the space and the port may also provide an opening through which the porous body can be inserted into the drum interior.

BRIEF DESCRIPTION OF THE DRAWINGS

By way of example one embodiment of the invention will now be described with reference to the accompanying drawings, in which.

DETAILED DESCRIPTION OF THE DRAWINGS

Figure 1:
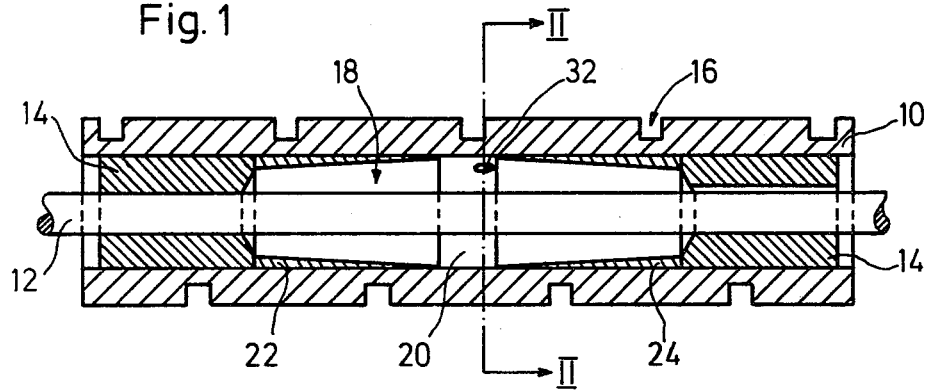
FIG. 1 is a longitudinal section through a drum in accordance with the invention.

FIG. 1 illustrates a cylindrical cam drum 10 supported on a driven shaft 12 by carrier sleeves 14 secured to the drum and shaft in any convenient manner. Formed in the outer circumferential surface of the drum 10 is a double helical groove 16 of a known form. When the cam drum is mounted for rotation in a traverse mechanism of a winding machine, and a slider shoe (not shown) of a thread guide is engaged in the groove 16, the shoe (and therefore the thread guide) is reciprocated longitudinally of the drum when the latter rotates. A system of this type is shown, e.g. in Swiss Pat. No. 575,335, the disclosure of which is incorporated in the present specification by reference, but the present invention is not limited to use with a system of that type.

A space 18 is formed within the drum 10 surrounding the shaft 12 and between the carrier sleeves 14. The outer circumference of this space 18 is defined, in its central zone, by a band 20 of the internal circumferential surface of the drum 10 and, in its outer zones, by the interior surfaces of two tubular inserts 22, 24 respectively. These inserts are secured, e.g. by bonding, to the interior surface of the drum. The wall thickness of each insert 22, 24 tapers in a direction towards the band 20, so that the portion of the space 18 therein tapers in the opposite direction. A similar formation could of course be made integral with the drum.

Figure 2:
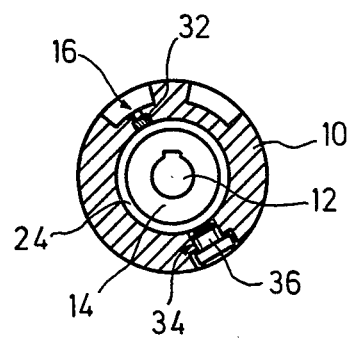
FIG. 2 is sectioned side elevation of the same drum taken on the line II—II in FIG. 1.
Figure 4:
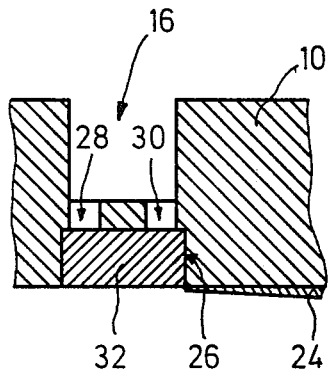
FIG. 4 is a part section on the line IV—IV in FIG. 3.
Figure 3:
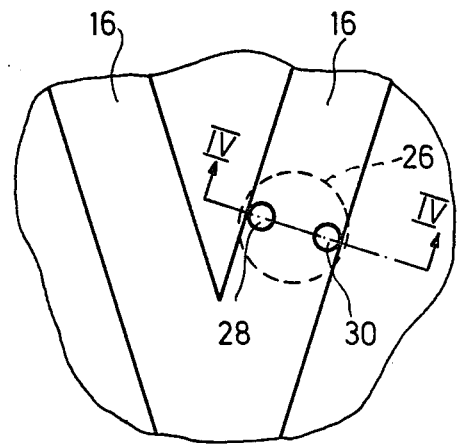
FIG. 3 is a plan view of a detail of the drum showing the positions of the outlet ports of a lubricant passage.

Extending through the wall of the drum 10 is a passage best seen in FIG. 4 and comprising an inner portion 26 of diameter approximately equal to the width of the groove 16 and two outlet ports 28, 30 respectively extending between passage portion 26 and the groove 16. Port 28 opens onto the groove adjacent the left hand flank and port 30 opens onto the groove adjacent the right hand flank. Passage portion 26 is filled by a sintered metal, disc-shaped plug 32 which is a press fit in the said passage portion. Diametrically opposite the passage, drum 10 has an opening 34 (FIG. 2) communicating with the space 18 but normally closed by a removable cap 36, e.g. a screw threaded cap. The plug can be mounted in the passage by passing it through opening 34.

In use, space 18 is filled with a lubricant, e.g. oil or grease, via the opening 34. When the drum is stationary, the porosity of the sintered plug 32 is such, in relation to the viscosity of the lubricant, that the latter will not leak significantly through the plug 32 even when the outlet ports 28, 30 open directly downwardly. On the other hand, when the cam drum is driven, centrifugal force urges the lubricant against the circumferential wall defining the space 18 and therefore out through the sintered plug 32 and the ports 28, 30. The lubricant emerging from both ports flows onto the base of the groove 16; the lubricant emerging from port 28 flows onto the lefthand flank as viewed in FIG. 4 and the lubricant emerging from port 30 flows onto the right hand flank. This lubricant in the groove 16 is picked up by the slider shoe as it passes over the plug 32 and is smeared thereby along the full length of the groove 16. Obviously, more than one such passage, spaced at suitable intervals along the length of the drum, could be provided if the single, central passage is found insufficient for adequate lubrication of the full length of the groove. The tapered surfaces on the interior of the inserts 22, 24 direct the lubricant onto the band 20, and therefore into the region of the passage containing plug 32, when the lubricant is urged outwardly against those tapered surfaces by centrifugal force. It is found that a very low taper (e.g. less than 5°) in the wall thickness of the inserts is sufficient for this purpose.

Figure 5:
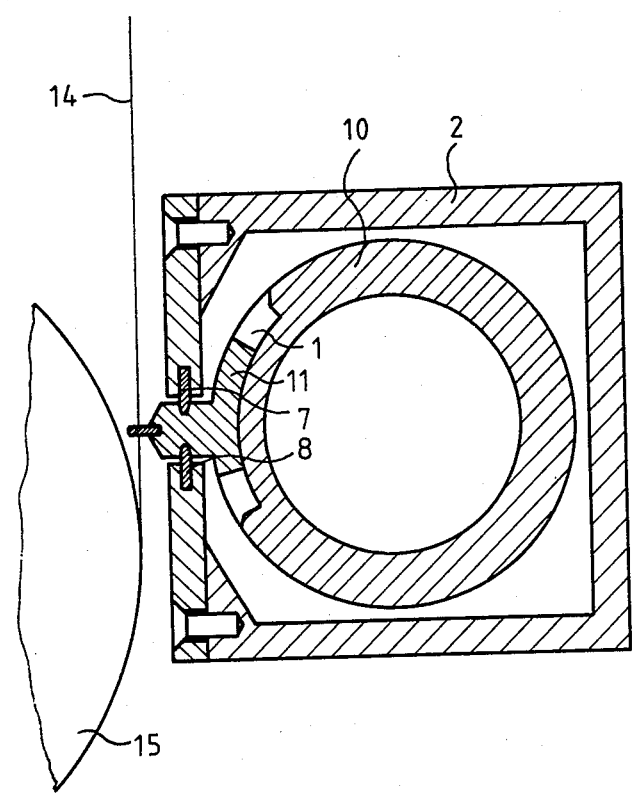
FIG. 5 is a schematic cross-sectional view of a yarn traverse mechanism constructed in accordance with the invention.

Clearly, as shown in FIG. 5, the invention includes a traverse mechanism for a winding machine comprising a drum 10 in accordance with the invention, means (not shown) for rotating the drum and a slider 11 for cooperation with the cam groove 16 therein. The traverse mechanism may include linear track means 7, 8 as well known in the prior art for ensuring controlled reciprocation of the slider 11 and a thread guide 13 carried thereby. As is customary in the art the mechanism may include a housing 2 enclosing the cam drum 10 and provided with an exit slot through which a portion of the slider 11 passes so that the thread guide projects from the housing 2 to guide a thread 14 onto a bobbin package 15. The invention further includes a winding machine comprising such a traverse mechanism.

Strictly by way of example, details of an embodiment which has run successfully under test conditions over several months will now be given. The embodiment is as illustrated in the drawings, the dimensions and the test operation conditions being as follows
Length of drum 10—270 mm
External Diameter of Drum 10—66 mm
Depth of Groove 16=Width of Groove 16—8 mm
Wall thickness of Drum 10—13 mm
Approx Volume of Space 18—92 cm$^3$
Diameter of Plug 32—7.5 mm
Axial Length of Plug 32—4 mm
Diameter of each Outlet Port 28, 30—2 mm
Material of Plug 32—Sintered Bronze (bearing metal)
Porosity of Plug 32—24 to 27%
Lubricant—Grease: Klüber, Isoflex-tel Altemp 3000
Drum Speed—7000 r.p.m.

The test system has run successfully for about five months without refilling of space 18. Slight excess lubrication was observed and this may be due to leakage between the plug and surrounding passage wall, so that it may be preferable to glue the plug in place or otherwise seal this gap. Further, a lubricant which leaves no residue within the drum is preferable as otherwise the plug may tend to block after protracted use. Both oil and grease are suitable. The illustrated arrangement will operate satisfactorily at drum speeds in the range 2000–9000 r.p.m.

It will be understood that the porosity and dimensions of the body can be adjusted to take account of the designed operating circumstances e.g. rotation rate, lubricant viscosity, desired lubrication rate. The optimum combination for a given set of circumstances is best established empirically. However, as a guide, the following test results have been obtained to indicate the flow control properties of sintered bodies as described in the detailed example given above. In these tests, the body was located in a special test rig in which it could be subjected to lubricant under controlled pressure on one axial face and the amount of lubricant passing though to the opposite axial face could be measured. Lubricant flow rates were measured for various applied pressures (corresponding with respective different rotation rates) with the following results:

| Test I Lubricant - oil: viscosity 125cSt centistokes. | | |
| --- | --- | --- |
| Applied Pressure | Corresponding Rotation Rate | Flow Rate |
| 0.4 bar | ~ 5000 r.p.m | 0.04 ml/hour |
| 0.8 bar | ~ 7100 r.p.m | 0.075 ml/hour |
| 1.2 bar | ~ 8700 r.p.m | 0.115 ml/hour |

| Test 2 Lubricant - oil : viscosity 35cSt | | |
| --- | --- | --- |
| Applied Pressure | Corresponding Rotation Rate | Flow Rate |
| 0.4 bar | ~ 5000 r.p.m | 0.17 ml/hour |
| 0.8 bar | ~ 7100 r.p.m | 0.32 ml/hour |
| 1.2 bar | ~ 8700 r.p.m | 0.47 ml/hour |

The invention is therefore not limited to the illustrated embodiment. For example, the disc shape of the plug is not essential though a plug of uniform thickness in the radial direction of the drum will normally be preferred. Where it is desired to provide additional lubrication to the groove flanks, the outer passages 28, 30 can open directly onto those flanks—for example, each passage could extend at a small angle to the radial direction as viewed in FIG. 4 and could intersect the junction between the base and flank of the groove, thus opening onto both the flank and the groove base.

The invention enables very simple but effective lubrication of the groove of the traverse cam drum, without calling for an external controlled pressure feed of lubricant or for complicated valve mechanisms in the supply passages leading to the grooves. The porous (sintered) body itself provides the sole necessary limiting factor on the flow of lubricant through the passage, and centrifugal force provides the drive means to urge the lubricant to the groove.

The invention is suitable for use in traverse mechanisms of a wide variety of winding machines—in each case performing the function of traversing the thread longitudinally of a winding mandrel as the latter is rotated. The thread guide member thus preferably carries a self-threading guide element in use. By way of example only, reference can be made to the winding machines disclosed in U.S. Pat. Nos. 3,856,222 and 4,036,446 and U.S. patent applications Ser. Nos. 945,330 filed Sept. 25, 1978 and 26,047 filed Apr. 2, 1979: the disclosure in each of these patents and applications is incorporated in this application by reference. The traverse cam drum may be driven by any suitable means—for example by a drive derived from the main drive to the winding mandrel—and the traverse drive may be arranged to produce either precision or wild (random) windings. By way of example only, reference may be made to the traverse mechanisms shown in U.S. Pat. Nos. 3,934,831 and 4,116,396 for further details of traverse mechanisms and the disclosures in these patents are included in the present application by reference.

What is claimed is:

1. A traverse cam drum for a winding machine thread traversing mechanism comprising said drum and a thread guide member having a slider portion which co-operates with an external groove in the drum so that the thread guide member is reciprocated longitudinally of the cam drum during rotation of the latter about its axis, said drum comprising a closable space within the drum adapted to contain a supply of lubricant in use, a passage communicating said space with said groove such that centrifugal force acting on lubricant in said space in use will tend to force it along said passage to the groove, and a porous body in an inner portion of the passage with said body being spaced from said groove to avoid contact with said slider portion, the pores of the body providing through-flow channels which permit a limited flow of a given lubricant to pass through the passage to the groove at a given rotational speed of the drum.

2. A drum as claimed in claim 1 wherein said porous body is a sintered metal body.

3. A drum as claimed in claim 1 wherein the porosity of said body lies in the range 20 to 35%.

4. A drum as claimed in claim 1 wherein said passage comprises a radially inner portion of relatively large cross section to receive said body and an outer portion of smaller cross section opening onto said groove.

5. A drum as claimed in claim 4 wherein said passage comprises a pair of outer portions opening onto the groove adjacent respective groove flanks.

6. A cam drum as claimed in claim 1 wherein the porous body is a press fit in said passage.

7. A drum as claimed in claim 6 wherein means are provided to seal the circumference of the body surrounding the through flow channels to the adjacent wall of the passage.

8. A drum as claimed in claim 1 wherein said space is at least partly defined by a portion of an internal surface of a wall of the drum and said passage opens onto said surface portion.

9. A drum as claimed in claim 1 wherein the radially outer surface defining the space is at least partially tapered in a sense tending to feed lubricant towards the passage during rotation of the drum in use.

10. A drum as claimed in claim 9 wherein the taper on said radially outer surface of the space is produced by means of an insert secured in a bore of uniform cross section in the drum interior.

11. A drum as claimed in claim 1 and having a wall provided with a closable port giving access to said space to enable refilling thereof.

12. A drum as claimed in claim 11 wherein said port is located substantially opposite said passage and provides an opening to enable insertion of the porous body into said passage.

13. A traverse mechanism for a winding machine for textile threads comprising a drum in accordance with claim 1, means mounting the drum for rotation about its own axis, means for rotating the drum, and a thread guide member having a slider co-operating with the cam groove in the drum.

14. A traverse mechanism as claimed in claim 13 and further comprising a linear track means co-operating with said slider to define a path for reciprocation of the slider during rotation of the drum.

15. A traverse mechanism as claimed in claim 14 and further comprising a housing enclosing the cam drum, said housing having an exit slot through which a portion of the slider projects and which provides said track means.

16. A traverse cam drum for a thread winding machine comprising
    a body defining an interior space for lubricant and having an outer circumferential surface;
    a groove in said outer circumferential surface of said body for guiding a thread guide member therein;
    a passage communicating said interior space with said groove; and
    a porous body disposed in an inner portion of said passage with said body being spaced from said groove to avoid contact with a slider of a thread guide member in said groove, said body having a porosity relative to the viscosity of a lubricant in said interior space sufficient to permit a flow of the lubricant from said interior space through said passage into said groove at a given rotational speed of said body.

17. A traverse cam drum as set forth in claim 16 wherein said porous body has a porosity in the range of from 20% to 35%.

18. A traverse cam drum as set forth in claim 16 which further includes an opening communicating with said interior space and disposed in said body opposite said passage, said opening being sized to permit passage of said porous body therethrough, and a removable cap closing said opening.

19. A traverse cam drum as set forth in claim 16 wherein said passage has a pair of ports extending between said inner portion and said groove to communicate with opposite flanks of said groove.

* * * * *